B. J. BLOOMFIELD.
MEANS FOR SECURING ARTICLES ON MANDRELS, SPINDLES, AND THE LIKE.
APPLICATION FILED MAY 19, 1919.
1,382,949.
Patented June 28, 1921.
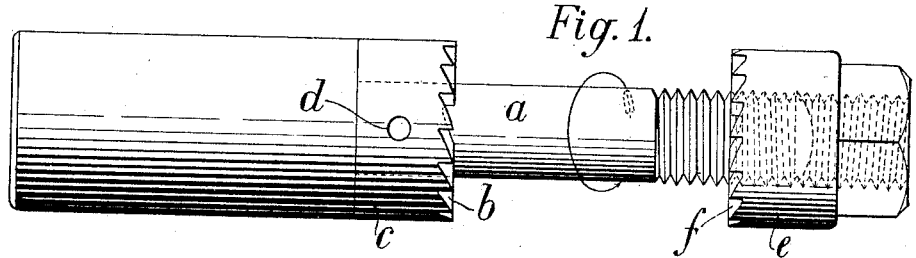
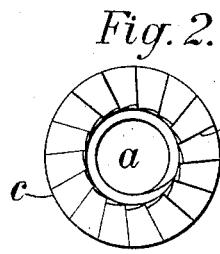
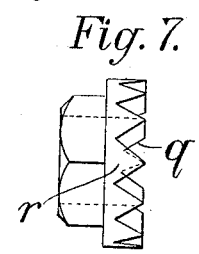
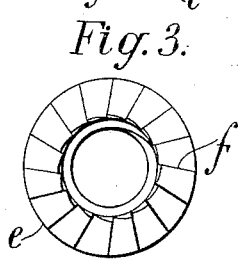
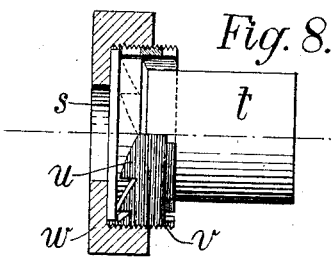
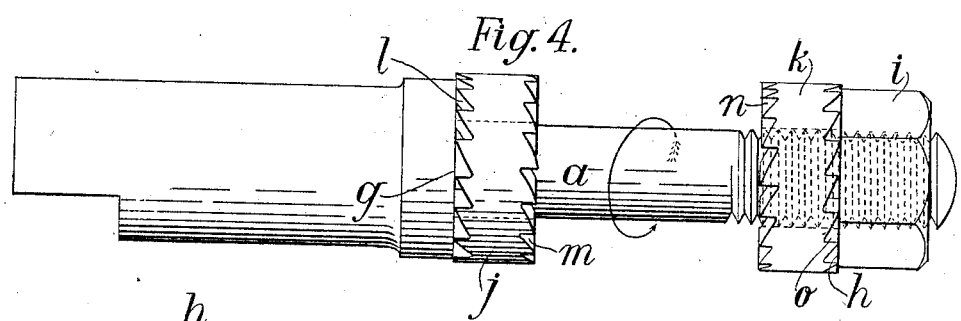
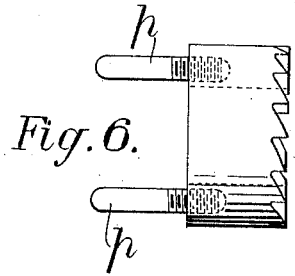
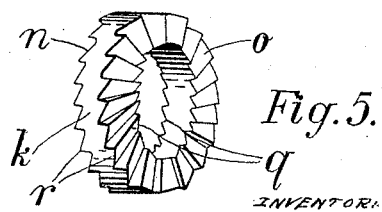
INVENTOR:
B. J. Bloomfield.
by
ATY.

UNITED STATES PATENT OFFICE.

BENARES JESSE BLOOMFIELD, OF BRIGHTON, ENGLAND.

MEANS FOR SECURING ARTICLES ON MANDRELS, SPINDLES, AND THE LIKE.

1,382,949.  Specification of Letters Patent.  Patented June 28, 1921.

Application filed May 19, 1919. Serial No. 298,279.

*To all whom it may concern:*

Be it known that I, BENARES JESSE BLOOMFIELD, a subject of His Majesty the King of England, and resident of Brighton, in the county of Sussex, Kingdom of England, have invented certain new and useful Improved Means for Securing Articles on Mandrels, Spindles, and the like, of which the following is a specification.

This invention relates to means for securing articles on mandrels, spindles and the like.

The invention has for its object to provide improved and simple means for quickly, easily and firmly securing pieces of work to be turned, milled or otherwise machined, and flywheels and other articles upon mandrels, spindles, shafts and the like, and in such manner that the work or articles are automatically and positively locked against rotation upon and relatively to the mandrels, spindles, shafts and the like, the arrangement being such that the more resistance is opposed to the rotation of the work or article, such as when pressure is applied to the work during the operation of machining the same, the more are they locked to the mandrels, spindles or the like. These locking means provide a great improvement over the general practice of pressing or sweating pieces of work and articles upon their mandrels, spindles or the like.

According to the invention a shoulder or the like on the mandrel or the like, and (or) a nut and (or) a collar fitted on said mandrel or the like is or are provided with gripping teeth or the like and adapted to coöperate with one another and with one or more pieces of work or articles mounted on the mandrel or the like to prevent relative rotation of the latter and the work or articles.

Several methods of carrying out the invention will now be described with reference to the accompanying drawings, in which:—

Figure 1 is a side elevation of a mandrel and nut having the invention applied thereto.

Figs. 2 and 3 are end views of the mandrel and lock nut, respectively, of Fig. 1.

Fig. 4 is a side elevation of ordinary types of mandrel and nut provided with two forms of locking collars constructed in accordance with the invention.

Fig. 5 is a perspective view of one of the collars shown in Fig. 4.

Fig. 6 is a side elevaton of a modified form of locking collar.

Fig. 7 is a side elevation of a modified form of locking nut.

Fig. 8 is a partly sectional elevation of a modified method of carrying out the invention.

In carrying out the invention, and as shown in Figs. 1 to 3, teeth $b$ may be formed on a separate sleeve $c$ rigidly secured on the mandrel or the like $a$ such as by a cross pin $d$, and a lock nut $e$ fitted on the mandrel or the like may be formed with teeth $f$ on its face disposed opposite to the teeth $b$. The teeth $b$ and $f$ on the mandrel or the like and the nut incline, as shown in Fig. 1, toward one another and in the direction of rotation of the mandrel or the like, that is, in opposite direction to that in which pressure is applied to the work during the operation of machining the same and in which the nut is screwed on to the mandrel or the like toward a piece of work or an article mounted on the latter. With this construction, after the work or article has been mounted upon the mandrel or the like $a$ against the teeth $b$, and the nut $e$ has been screwed up tight so that its teeth engage the work or article, pressure upon the work or article, such as during a turning, milling or other machining operation, tends to cause the work or article to slip on the mandrel or the like and turn on the latter in reverse direction to the rotation of the same, so that the nut $e$ is automatically screwed up tighter upon the mandrel or the like owing to the engagement of its teeth $f$ with the work or article, and these teeth are forced into the substance of the work or article and positively lock it against rotation on the mandrel or the like against such pressure similarly, the teeth $b$ on the mandrel are forced into the opposite side of the work or article.

If desired, in slight modifications or arrangements, the teeth $b$ may be provided with shoulders or the like formed integrally with the mandrel or the like $a$, or particularly with light work or articles, the teeth $b$ or $f$ may be dispensed with, one set of teeth being depended upon to lock the work or article upon the mandrel or the like.

In another method of carrying out the invention and as shown in Figs. 4 and 5, the shoulder $g$ of the mandrel or the like $a$ and the inner face $h$ of the nut $i$ may be quite plain without teeth, one, two or more self-locking collars such as $j$ and $k$ being mounted upon the mandrel or the like between said shoulder and nut. Each of the collars $j$ and $k$ is shown as being formed with two sets of teeth $l$ and $m$, $n$ and $o$, respectively, one set on each side or end thereof, the teeth on one side or end inclining in a direction opposed to the direction of rotation of the mandrel or the like, and the teeth on the opposite side or end inclining toward said direction of rotation. With the construction shown a self-locking collar is disposed on each side of the piece of work or article to be held, and when opposition is offered to the rotation of the latter the teeth $n$ engage in one side of the work or article thus causing the teeth $o$ to grip the nut $i$ and screw up and tighten the same upon the mandrel or the like $a$, and the nut presses, through the collar $k$, the work or article against the teeth $m$ which latter thus grip the other side of the work or article, and the teeth $l$ engage in the surface of the shoulder $g$, so that the work or article is automatically and positively locked against rotation upon the mandrel or the like.

In modified arrangements of Fig. 4 the collar $j$ or the collar $k$ may be dispensed with, the nut $i$ can be provided with teeth inclined in the direction of rotation of the mandrel or the like and be employed with or without a collar having teeth as $n$ on its side or end next to the work or article and a plain side or end adjacent to the nut, and one or more toothed collars such as $k$ may be arranged between two or more pieces of work or articles mounted upon a single mandrel or the like. A number of collars of various thicknesses may be provided to enable the securing means to be used on a single mandrel or the like with pieces of work or articles of different thicknesses.

In place of the collars $c$ and $j$ of Figs. 1 and 4, respectively, a removable toothed collar such as shown in Fig. 6 may be fitted upon the mandrel or the like, said collar being provided with means for detachably locking it to a shoulder or the like on said mandrel or the like, suitable means for this purpose consisting of one or more pins $p$ rigid with the collar and adapted to engage within holes formed in said shoulder or the like.

For holding light pieces of work such as flanged sockets or the like while they are being machined, and which pieces of work could not be easily and separately held in a self-centering chuck, if at all, the device shown in Fig. 8 may be employed. The flange $s$ of the socket $t$ is gripped between the teeth or the like $u$ on an externally screw-threaded locking collar $v$ and a socket member $w$ into which said collar is screwed. The device can be used for machining holes in washers and in very thin sheet metal or other material, and for many operations in which it is difficult to secure the work. The socket member $w$ can be mounted in a self-centering or other chuck or it may be adapted to be screwed or otherwise secured to the mandrel nose of a lathe.

The shape of the teeth on the various members and the angular disposition of the sharp edges of said teeth relatively to said members, may be modified, for instance, they may be as shown in Fig. 7 which illustrates a modified form of lock nut. Preferably, and as illustrated more clearly in Figs. 5 and 7, the teeth increase in depth from their inner ends $q$, toward their outer end $r$.

One or more of the toothed members may be hardened or tempered if required.

A toothed nut such as shown in Fig. 1 or 7 may be used on an ordinary mandrel for light work. When the screw-threads on the mandrel or the like are insufficient to allow a nut to screw right up into contact with the work or article to be held thereon, one or more locking collars such as $k$ may be used as a distance piece or pieces between said nut and said work or article. Two locking nuts may be used to hold an article on a mandrel not provided with a shoulder; for example, on a lathe mandrel under ordinary working practice. At the headstock or driving end of the mandrel would be a left hand thread, and at the tailstock end a right hand thread. The threads in the nuts would then be right hand and left hand respectively, and the teeth on both would follow the direction of rotation of mandrel. When there is an inclined angle to the teeth on the locking collars, then the angle of the teeth at the side or end of such a collar impinging on a mandrel shoulder must always be away from the direction of rotation of the mandrel, but toward the direction of pitch of the screw threads on said mandrel. At the other side of this collar, impinging on the work, the direction of the angle of the teeth must be toward the direction of rotation of the mandrel, as in the case of the collar $j$. The other self-locking collar $k$ is used as a direct self-locking action either with a plain nut or as a locking piece between articles to be held, and the teeth thereon must be in opposite directions to those on the collar $j$.

A left hand thread on a lathe mandrel used in the ordinary way would be mechanically incorrect and very bad practice, as any pressure put upon an article to be held would unscrew the nut. But a left hand thread may be used on a lathe or other mandrel and be mechanically correct, providing that the screwed end of the mandrel is used as the driving end, and the mandrel shoulder is nearest to the tailstock of the lathe and revolving on a dead center. Then the angle of the teeth of a self locking nut would be the same as described in connection with the nut e, but if self locking collars are used a collar as k would be placed against the mandrel shoulder and a collar j would be fitted as a distance piece between articles to be held or against an ordinary lock nut.

The self locking nuts provided by the invention are positive locks and self-holding, independent of the assistance of any key or cotter pin to hold the work or article, whereas existing lock nuts rely on the fact that they are only lock nuts in the sense that they lock themselves on the spindle and do not prevent an article from revolving or rotating on said spindle.

What I claim is:—

1. In combination with a work-supporting mandrel adapted to be revolved in use, of means for securing a work piece in fixed relation on the mandrel, said means including a member adjustably mounted with relation to the mandrel and provided with means to be engaged by the work piece whereby said member is automatically operable through movement of the work piece in one direction to increase its work piece holding effect through such adjustability.

2. In combination with a work-supporting mandrel adapted to be revolved in use, of means for securing a work piece in fixed relation on the mandrel, said means including a member fixed with relation to the mandrel and a second member adjustable in the mandrel, said members engaging opposite faces of a work-piece to secure the same in fixed relation to the mandrel, said second member being provided with means to be engaged by the work-piece whereby said second member is automatically adjustable on the mandrel to increase its holding effect on the work-piece under movement of the work-piece in one direction on the mandrel.

3. In combination with a work-supporting mandrel adapted to be revolved in use, of means for securing a work piece in fixed relation on the mandrel, said means including members on the mandrel to engage opposite sides of the work-piece to hold the same against movement on the mandrel, one of said members having threaded adjustment on the mandrel and having teeth to engage with the work-piece, whereby in independent movement of the work piece in one direction, the said adjustable member is automatically operated to increase its pressure on the work-piece.

4. In combination with a work-supporting mandrel adapted to be revolved in use of a work engaging member secured upon the mandrel and formed on the work engaging face with teeth inclined in the direction of rotation of the mandrel, a second work engaging member to engage the opposite face of the work and formed on its work engaging face with teeth inclined in the direction of rotation of the mandrel, said second work engaging member being threaded on the mandrel in a direction opposite to the direction of rotation of the mandrel, whereby in independent movement of the work piece opposite the direction of rotation of the mandrel the second work engaging member is, through such movement of the work-piece, automatically operated to increase its pressure on the work piece.

5. In combination with a work supporting mandrel formed with a shoulder of a work piece engaging member to bear on said shoulder and having its opposite faces formed with teeth, the teeth on that face of the member next the work-piece inclining in the direction of rotation of the mandrel, a second work engaging member threaded on the mandrel to engage the opposite face of the work-piece, said second member having teeth on the face next the work-piece inclined in the direction of rotation of the mandrel and being threaded on the mandrel in a direction opposite to that of the rotation of the mandrel, and a nut threaded on the mandrel beyond said second member to secure said second member against unscrewing movement.

In testimony whereof I have hereunto signed my name.

BENARES JESSE BLOOMFIELD.